United States Patent [19]
Ochi

[11] Patent Number: 5,785,780
[45] Date of Patent: *Jul. 28, 1998

[54] ICE/SNOW ROAD-RUNNING PNEUMATIC TIRES

[75] Inventor: Naoya Ochi, Kodaira, Japan

[73] Assignee: Bridgestone Corporation, Tokyo, Japan

[*] Notice: The term of this patent shall not extend beyond the expiration date of Pat. No. Des. 378,504.

[21] Appl. No.: 569,009

[22] Filed: Dec. 7, 1995

[30] Foreign Application Priority Data

Dec. 7, 1994 [JP] Japan ................. 6-303997

[51] Int. Cl.$^6$ ............... B60C 11/12; B60C 115/00
[52] U.S. Cl. ............... 152/209 R; 152/209 D; 152/DIG. 3
[58] Field of Search ............ 152/209 R, 209 D, 152/DIG. 3

[56] References Cited

U.S. PATENT DOCUMENTS

| | | | |
|---|---|---|---|
| D. 378,504 | 3/1997 | Ochi et al. ............. | D12/147 |
| 2,094,636 | 10/1937 | Bull ............... | 152/209 R |
| 3,090,417 | 5/1963 | Spelman ............. | 152/354 |
| 4,258,769 | 3/1981 | Makino et al. ........ | 152/209 R |
| 4,598,747 | 7/1986 | Flechtner ............. | 152/209 R |
| 4,700,762 | 10/1987 | Landers ............. | 152/209 R |
| 4,785,863 | 11/1988 | Tsuda et al. ......... | 152/209 R |
| 5,176,766 | 1/1993 | Landers et al. ....... | 152/209 R |
| 5,223,059 | 6/1993 | Himuro .............. | 152/209 R |
| 5,388,625 | 2/1995 | White ................ | 152/209 R |
| 5,423,364 | 6/1995 | Himuro .............. | 152/209 R |
| 5,501,258 | 3/1996 | Sulkowski ............ | 152/209 R |

FOREIGN PATENT DOCUMENTS

| | | | |
|---|---|---|---|
| 0 325 905 | 8/1989 | European Pat. Off. . | |
| 0 503 407 | 9/1992 | European Pat. Off. . | |
| 258779 | 8/1988 | Germany ............ | 152/209 R |
| 43 00 695 A1 | 7/1994 | Germany . | |
| 63-263105 | 10/1988 | Japan ............... | 152/209 R |
| 1119 | 1/1994 | Japan ............... | 152/209 D |

*Primary Examiner*—Steven D. Maki
*Attorney, Agent, or Firm*—Sughrue, Mion, Zinn, Macpeak & Seas, PLLC

[57] ABSTRACT

A pneumatic tire provided with a tread pattern, said tread pattern including a wider circumferential straight groove dividing the tread into right and left sides and having 7–25% of the width of the tread, a pair of circumferential ribs provided adjacent to right and left sides of the wider circumferential straight groove, respectively and each having 2.5–15% of the width of the tread, and a pair of narrower circumferential straight grooves provided adjacent to and axially outside the circumferential ribs, respectively, and each having a groove width being 0.5 to 5% of that of the tread and a groove depth being 50 to 100% of that of the wider circumferential straight groove, wherein: each of the circumferential ribs is provided with a plurality of sipes extending obliquely relative to the circumferential direction while being spaced in the circumferential direction, a depth of each sipes being 25 to 100% of the groove depth of the wider circumferential straight groove.

6 Claims, 5 Drawing Sheets

FIG_4
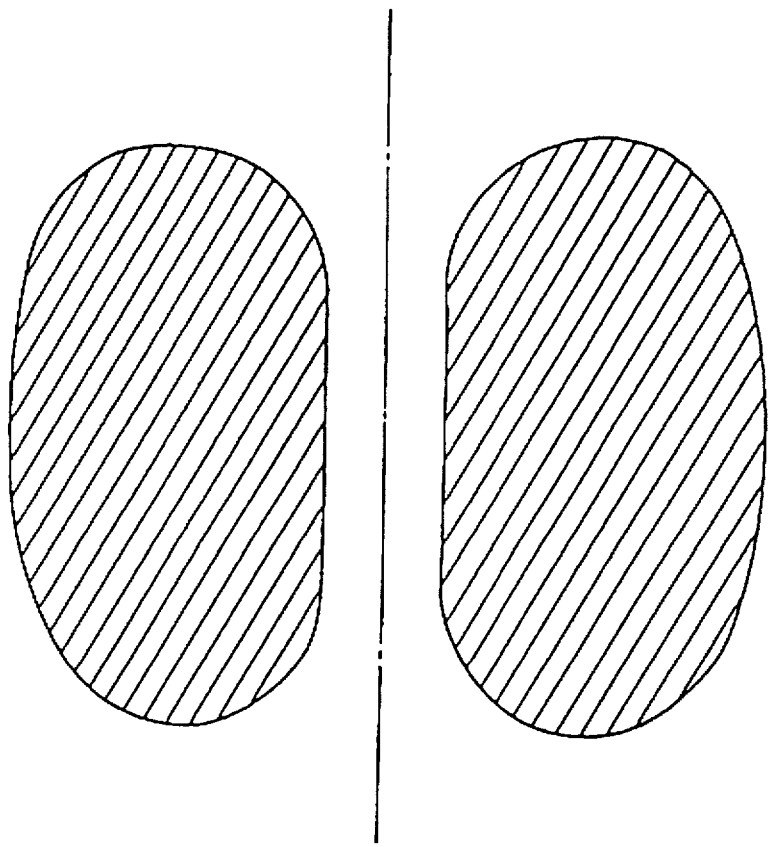

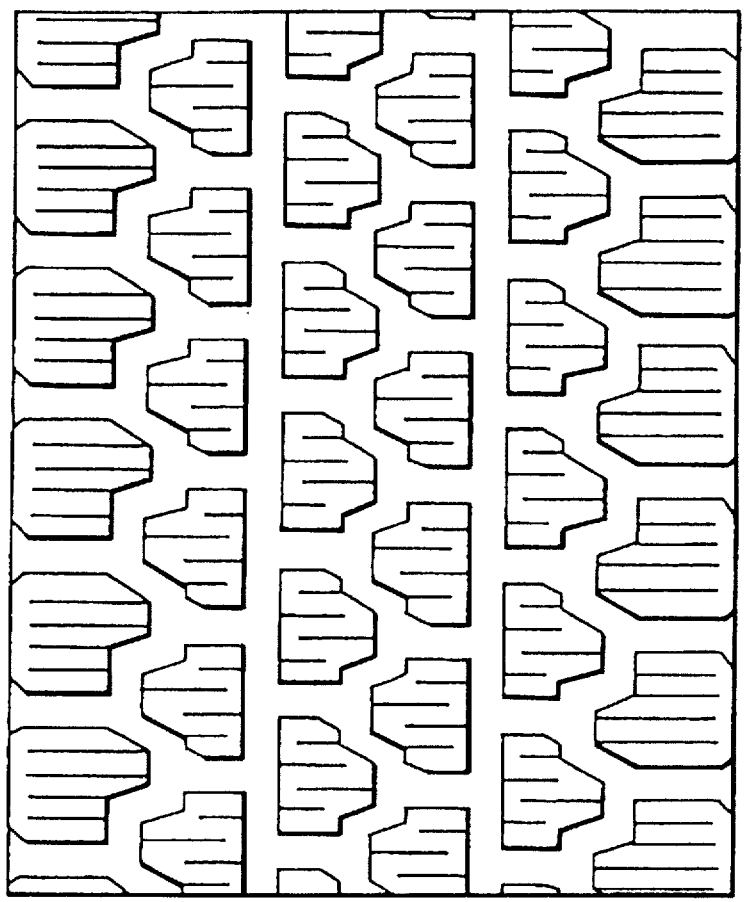
FIG_5
PRIOR ART

ICE/SNOW ROAD-RUNNING PNEUMATIC TIRES

BACKGROUND OF THE INVENTION

(1) Field of the Invention

The present invention relates to ice/snow road-running pneumatic tires. In particular the invention relates to pneumatic tires which exhibit excellent ice road-running performance without deteriorating snow road-running performance.

(2) Related Art Statement

In FIG. 5 is shown a conventionally typical tread pattern to be applied to the ice/snow road-running pneumatic tires.

As shown, this typical ice/snow road-running pneumatic tires has a tread pattern in which circumferentially zigzag grooves and circumferential straight grooves are alternatively arranged in the width direction of the tire. The circumferentially and continuously zigzag and straight grooves are laterally connected via a number of lateral grooves which are spaced in the circumferential direction; plural rows of blocks are defined by the circumferential grooves and the lateral grooves; and a plurality of laterally straight sipes are formed in each of the blocks. This tire exhibits some performance in running on both snow and ice.

In the present specification, (1) the "circumferential straight groove" means a straight groove or a substantially straight groove which continuously extends in the circumferential direction;

(2) the "circumferential rib" means a straight rib or a substantially straight rib which continuously extends in the circumferential direction.

(3) The "circumferentially zigzag groove" means a groove which continuously extends zigzag in the circumferential direction.

(4) The "directionally inclined groove" means a groove which extends obliquely relative to the circumferential direction and which constitutes a so-called directional tread pattern. The directional tread pattern means that the turning direction is specified when the tire is fitted to a vehicle such that an inclined portion of the the above groove near the tire equatorial plane first contacts the ground and then an inclined portion thereof remote from the tire equatorial plate contacts the ground later when the tire rotates in the forward direction.

According to the conventionally typical ice/snow running pneumatic tire mentioned above, there is a tendency that if the tire becomes flattened and widened, the ground contact length of the tread becomes shorter although its ground contact width becomes greater so that the traction performance on ice and snow is deteriorated. In view of this, if the ground contact length is increased to enhance the traction performance, there is a tendency that the ground contact width becomes smaller so that the cornering performance is deteriorated.

Besides the conventional typical ice/snow road-running pneumatic tire mentioned above, a flat and wide tire is known in which drainage performance is intended to be improved by providing a wide circumferential straight groove in a central portion of a tread. However, rigidity of blocks adjacent to the wide circumferential straight groove is insufficient so that local wear may tend to occur.

SUMMARY OF THE INVENTION

It is an object of the present invention to provide a pneumatic tire with an ice/snow road-running pattern which effectively improves both the traction performance and the cornering characteristic on ice and snow roads and is unlikely to cause local wear.

In order to realize the above-mentioned object, the pneumatic tire according to the present invention is characterized by comprising a tread pattern which includes a wider circumferential straight groove dividing the tread into right and left sides, a pair of circumferential ribs provided adjacent to right and left sides of the wider circumferential straight groove, respectively, and a pair of narrower circumferential straight grooves provided adjacent to and axially outside the circumferential ribs, respectively, wherein:

(1) a groove width of the wider circumferential straight groove is 7 to 25% of the width of the tread;

(2) a width of each of the circumferential ribs is 2.5 to 15% of a width of the tread;

(3) each of said narrower circumferential straight grooves has a groove width being 0.5 to 5% of that of the tread and a groove depth being 50 to 100% of that of the wider circumferential straight groove; and (4) each of the circumferential ribs is provided with a plurality of sipes extending obliquely relative to the circumferential direction while being spaced in the circumferential direction, a depth of each sipe being 25 to 100% of the groove depth of the wider circumferential straight groove.

In order to realize the above object, according to the pneumatic tire of the present invention, it is preferable that a number of directionally inclined grooves and a number of blocks are arranged between said narrower circumferential straight grooves and each of end portions of the tread while being spaced from one another in the circumferential direction, and each of the blocks is provided with a number of sipes spaced in the circumferential direction.

In order to highly realize the braking traction performance on ice roads in the above object, according to the pneumatic tire of the present invention, it is preferable that a depth of each of the sipes provided in the circumferential ribs is smaller than the groove depth of the narrower circumferential straight grooves.

In order to highly realize the braking traction performance on snow roads in the above object, according to the pneumatic tire of the present invention, it is preferable that the depth of each of the sipes provided in the circumferential ribs is greater than the groove depth of each of the narrower circumferential straight grooves.

Since the pneumatic tire according to the present invention has the above-mentioned tread pattern, the groove width of the circumferential straight groove is as wide as 7 to 25% of that of the read and as shown in FIG. 4, the ground-contacting profile of the tread is divided into right and left portions being each in an elliptical shape elongated in the circumferential direction. Thereby, the tire in which the ground contacting width of the tread is large and its ground contact length is large can be obtained so that the traction performance and the cornering characteristic on ice and snow roads can be both effectively improved.

Since the conventional typical ice/snow road-running pneumatic tire mentioned above has an integrated ground contacting shape without being divided into right and left portions, the ground-contacting pressure near the central portion of the tread of the tread is at a maximum. On the other hand, since the maximum ground-contacting pressure area of the pneumatic tire according to the present invention is divided into the two right and left portions so that the ice breaking performance may be enhanced.

In order that the ground-contacting shape of the tread may be divided into the right and left portions each having the elliptical shape elongated in the circumferential direction, it is necessary that the groove width of the circumferentially straight groove is not less than 7% of the width of the tread. If this groove width is more than 25% of the width of the tread, the ground contact width of each of the right and left elliptical shapes elongated in the circumferential direction becomes narrower, so that the cornering characteristic is deteriorated.

According to the pneumatic tire, the width of each of the circumferential rib is 2.5 to 15% of the width of the tread, each of said narrower circumferential straight grooves has the groove width being 0.5 to 5% of that of the tread and the groove depth being 50 to 100% of that of the wider circumferential straight groove; and each of the circumferential ribs is provided with a plurality of the sipes extending obliquely relative to the circumferential direction while being spaced in the circumferential direction; and the depth of each sipes is 25 to 100% of the groove depth of the wider circumferential straight groove.

According to the pneumatic tire of the present invention, a pair of the circumferential ribs are continuously and circumferentially provided adjacent to right and left sides of the wider circumferential straight groove, respectively, and the width of each of the circumferential ribs is 2.5 to 15% of the width of the tread. Therefore, sufficient rigidity is afforded upon the tread so that occurrence of local wear near the wide circumferential straight groove can be prevented.

Since each of the circumferential ribs is provided with a number of sipes extending obliquely relative to the circumferential direction while being spaced in the circumferential direction, the width of the circumferential rib needs to be not less than 2.5% of that of the tread so that sufficient rigidity may be afforded upon the tread. If the width of the circumferential rib is more than 15% of the tread, the negative ratio of the central portion of the tread decreases to deteriorate the traction performance on snow roads.

Since each of the circumferential rib is provided with a number of sipes extending obliquely relative to the circumferential direction while being spaced in the circumferential direction, the braking performance and the traction performance on ice roads can be improved by edge components of the sipes near the central portion of the tread.

A plurality of sipes provided at the circumferential rib, extending obliquely relative to the circumferential direction while being spaced in the circumferential direction, has the depth being not less than 25% so as to obtain effective ice/snow performance and not more than 100% of the groove depth of the wider circumferential straight groove so as to ensure the durability.

When the depth of the sipe provided at the circumferential rib is smaller than the groove depth of the narrow circumferential straight groove, local wear resistance and the braking traction performance are enhanced. On the other hand, when the depth of the sipe provided at the circumferential rib is greater than the groove depth of the narrow circumferential straight groove, the braking traction performance on ice roads is improved.

According to the pneumatic tire of the present invention, each of said narrower circumferential straight grooves has the groove depth being 50 to 100% of that of the wider circumferential straight groove. As the narrower circumferential straight groove decreases, the rigidity of the tread near the central portion becomes higher so that local wear resistance may be better. In order to ensure running performance on ice/snow roads until at least 50% tread rubber is worn, the groove width of the narrower circumferential straight groove needs to be at least 50% of that of the wider circumferential straight groove. On the other hand, as the groove depth of the narrow circumferential straight groove increases, the volume of the groove increases so that performance on ice and hydroplaning characteristic on wet roads may be better. However, if the the groove depth of the narrow circumferential straight groove is greater than 100% of that of the wider circumferential straight groove, local wear resistance is extremely deteriorated.

According to the pneumatic tire of the present invention, it is preferable that a number of directionally inclined grooves and a number of blocks are arranged between said narrower circumferential straight grooves and each of end portions of the tread, while being spaced from one another, and each of the blocks are provided with a number of sipes spaced in the circumferential direction.

These and other objects, features and advantages of the invention will be appreciated upon reading of the following description of the invention when taken in conjunction with the attached drawings, with the understanding that some modifications, variations and changes could be easily made by the skilled person in the art to which the invention pertains.

BRIEF DESCRIPTION OF THE DRAWINGS

For a better understanding of the invention, reference is made to the drawings, wherein:

FIG. 4 is a view for illustrating a ground contacting profile of the pneumatic tire according to the present invention; and FIG. 5 is a plane view of the tread of the pattern of the conventionally typical pneumatic tire.

DETAILED DESCRIPTION OF THE INVENTION

Figure 1:
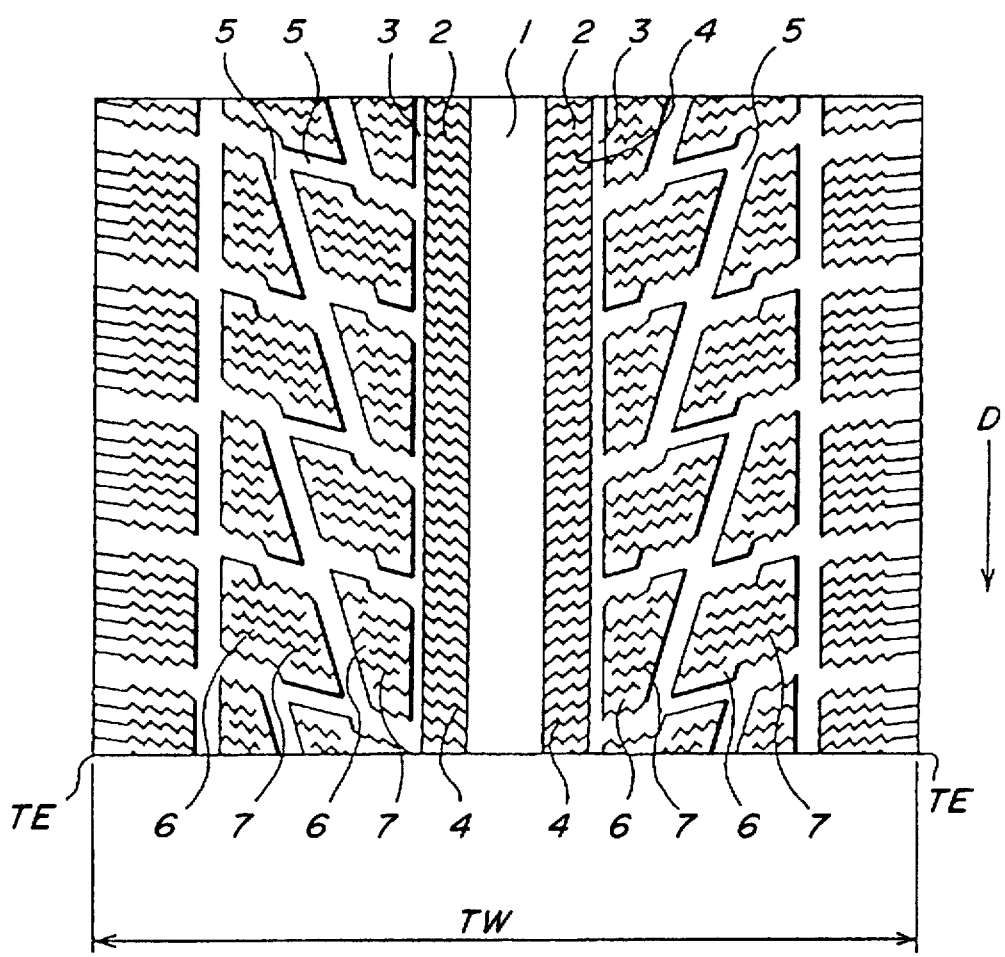
FIG. 1 is a plane view of a tread pattern of a pneumatic tire according to the present invention.
Figure 2:
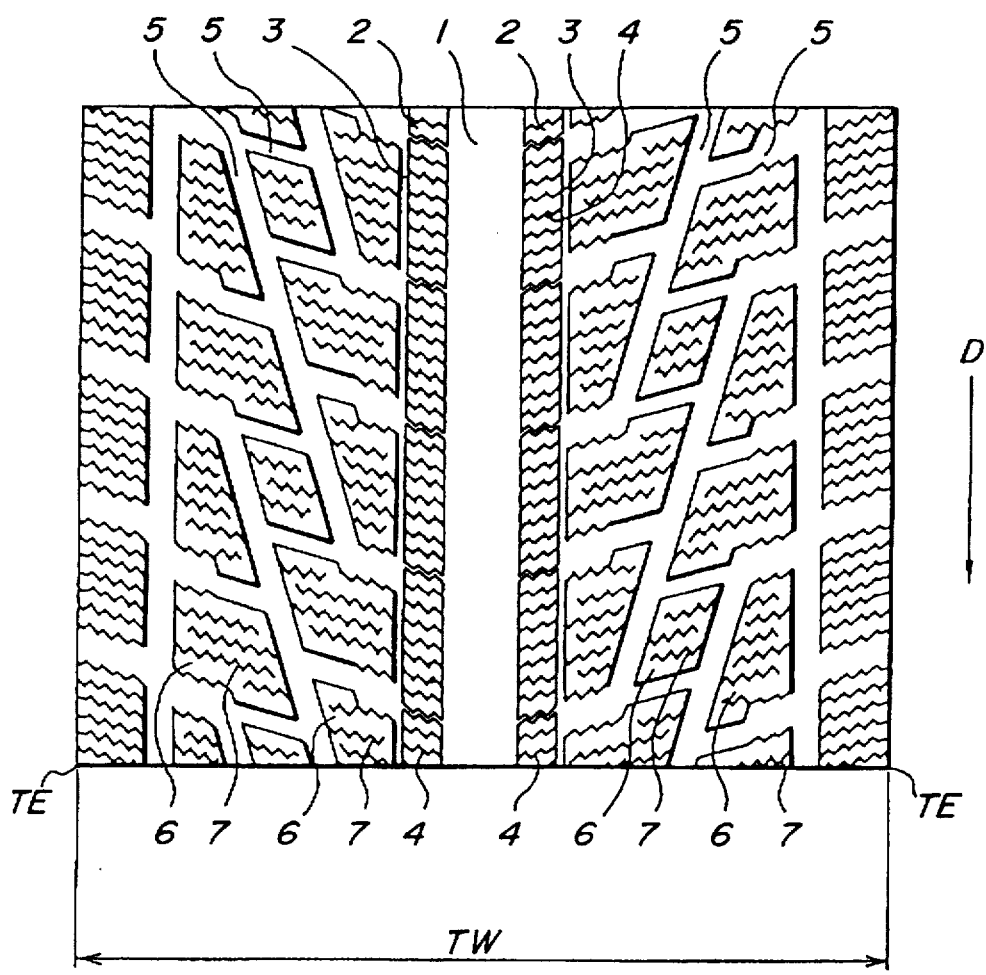
FIG. 2 is a plane view of another tread pattern of a pneumatic tire according to the present invention.
Figure 3:
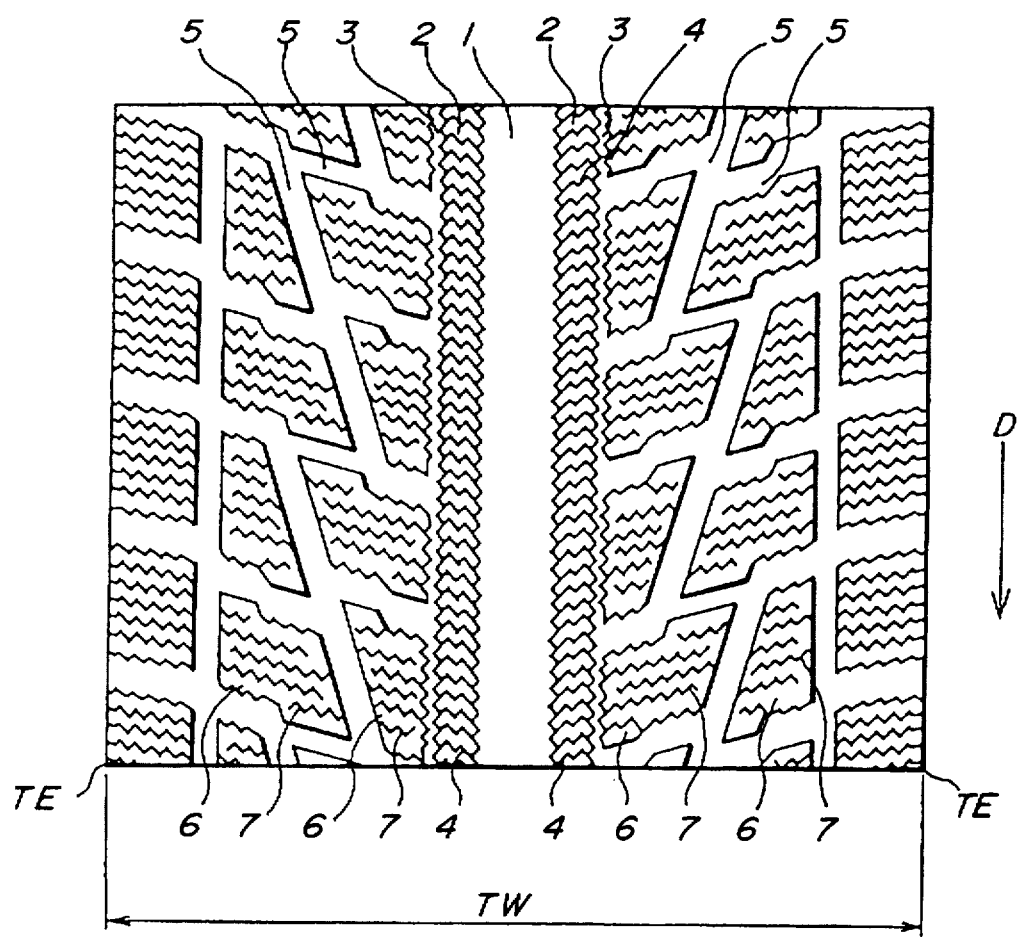
FIG. 3 is a plane view of a further tread pattern of a pneumatic tire according to the present invention.

Embodiments of the pneumatic tires according to the present invention will be explained with reference to the attached drawings. FIGS. 1 through 3 are tread patterns of passenger pneumatic tires according to the present invention as Examples 1 to 3. Their tire size is all 225/50R16.

The tread pattern of the pneumatic tire according to the present invention as Example 1 shown in FIG. 1 includes a wider circumferential straight groove 1 dividing the tread into right and left sides, a pair of circumferential ribs 2 provided adjacent to right and left sides of the wider circumferential straight groove 1, respectively, and a pair of narrower circumferential straight grooves 3 provided adjacent to and axially outside the circumferential ribs 2, respectively. The width of the tread is 214 mm and the negative percentage is 40%.

The groove width of the wider circumferential straight groove 1 is 20 mm (9.3% of the width of the tread). The width of each of the circumferential rib 2 is 12 mm (5.6% of the width of the tread). Each of said narrower circumferential straight grooves 3 has the groove width of 3.3 mm (1.5% of the width of the tread) and the groove depth of 7 mm (70% of the groove depth (10 mm) of the wider circumferential straight groove 1).

Each of the circumferential ribs 2 is provided with a number of 0.3 mm wide sipes 4 extending obliquely relative to the circumferential direction, and the depth of each sipe is 6 mm (60% of the groove depth (10 mm) of the wider circumferential straight groove).

A number of directionally inclined grooves 5 and a number of blocks 6 are arranged between said narrower circumferential straight grooves 3 and each of end portions TE of the tread while being spaced from one another in the circumferential direction, and each of the blocks 6 is provided with a number of sipes 7 spaced in the circumferential direction.

The so-called directional pattern is formed in which the rotating direction of the tire is specified when the tire is fitted to a vehicle such that an inclined portion of the directionally inclined groove near the tire equatorial plane first contacts the ground and then an inclined portion thereof remote from the tire equatorial plate contacts the ground later when the tire rotates in the forward direction.

In FIG. 2 is shown a tread pattern of the pneumatic tire according to the present invention as Example 2. This tire is provided with a wider circumferential straight groove 1 dividing the tread into right and left sides, a pair of circumferential ribs 2 provided adjacent to right and left sides of the wider circumferential straight groove, respectively, and a pair of narrower circumferential straight grooves 3 provided adjacent to and axially outside the circumferential ribs, respectively. The width of the tread is 210 mm, and the negative ratio is 43.5%.

The groove width of the wider circumferential straight groove 1 is 20 mm(9.5% of the width of the tread). The width of each of the circumferential ribs 2 is 10 mm (4.8% of the width of the tread), and each of said narrower circumferential straight grooves 3 has the groove width being 2 mm (1.0% of that of the tread) and the groove depth being 7 mm (70% of that of the wider circumferential straight groove).

Each of the circumferential ribs is provided with a plurality of sipes 4 extending obliquely relative to the circumferential direction while being spaced in the circumferential direction, the depth of each sipe being 7 mm which is 70% of the groove depth (10 mm) of the wider circumferential straight groove.

Most of the sipes 4 has the width of 0.3 mm, and other sipes 4 each having the width of 1 mm are arranged at the same pith as that of the right and left inclined grooves.

The other construction of Example 2 are fundamentally the same as that of the pneumatic tire in Example 1.

In FIG. 3 is shown a tread pattern of the pneumatic tire according to the present invention as Example 3. This tire is provided with a wider circumferential straight groove 1 dividing the tread into right and left sides, a pair of circumferential ribs 2 provided adjacent to right and left sides of the wider circumferential straight groove, respectively, and a pair of narrower circumferential straight grooves 3 provided adjacent to and axially outside the circumferential ribs, respectively. The width of the tread is 210 mm, and the negative ratio is 42.8%.

The groove width of the wider circumferential straight groove 1 is 20 mm(9.5% of the width of the tread). The width of each of the circumferential ribs 2 is 10 mm(4.8% of the width of the tread), and each of said narrower circumferential straight grooves 3 has the groove width being 3 mm (1.4% of that of the tread) and the groove depth being 7 mm (70% of that (10 mm) of the wider circumferential straight groove 1).

Each of the circumferential ribs 2 is provided with a number of 0.3 mm wide sipes 4 extending obliquely relative to the circumferential direction while being spaced in the circumferential direction, the depth of each sipe being 9 mm which is 90% of the groove depth (10 mm) of the wider circumferential straight groove.

The other construction of Example 3 are fundamentally the same as that of the pneumatic tire in Example 1.

As shown in FIG. 5 by way of example, the conventional pneumatic tire is provided with a tread pattern in which the zigzag grooves and the straight grooves are continuously extended in the circumferential direction of the tire and alternatively arranged in the tire width direction. Plural rows of blocks are formed by these circumferentially extending grooves and a number of lateral grooves spaced in the circumferential direction and connecting these circumferential grooves. A plurality of lateral straight sipes are formed at each block. The tire size is 225/50R16, and the width TW of the tread is about 170 mm.

The pneumatic tires according to the present invention shown in FIGS. 1 through 3 as Examples 1 to 3 as well as the above conventional pneumatic tire in FIG. 5 were subjected to evaluation tests for feeling characteristic on snow, braking performance on snow, feeling characteristic on ice, and braking performance on ice. The test conditions were that the internal pressure of front wheel tires was 2.3 Kg/cm$^2$, and that of rear wheel tires was 2.5 Kg/cm$^2$. The feeling characteristic on snow was totally evaluated based on brakability, starting characteristic, straight running performance, and cornering performance on a test course with a compacted snow road. The braking performance on snow was evaluated based on a braked distance when a vehicle was fully braked from a running state at 40 Km/h on compacted snow. The feeling characteristic on ice was totally evaluated based on the brakability, starting characteristic, straight running performance and cornering performance on ice. The braking performance on ice was an evaluation result when the vehicle was fully braked from a running state at 20 Km/h on ice.

Evaluation results are shown by index, while those of the conventional pneumatic tire were taken as 100. The greater the figure, the more excellent the tire performance.

The evaluation results are summarized in Table 1.

TABLE 1

| | Conventional Example | Example 1 | Example 2 | Example 3 |
|---|---|---|---|---|
| Feeling characteristic on snow | 100 | 115 | 115 | 120 |
| Braking performance on snow | 100 | 110 | 110 | 115 |
| Feeling characteristic on ice | 100 | 120 | 120 | 120 |
| Braking performance on ice | 100 | 125 | 120 | 115 |

From the results shown in Table 1, the pneumatic tires according to the present invention are more excellent than the conventional one with respect to the snow performance and ice performance.

According to the tread pattern of the pneumatic tire of the present invention, since the wider circumferential straight groove dividing the tread into right and left sides and having 7–25% of the width of the tread, a pair of circumferential ribs provided adjacent to right and left sides of the wider circumferential straight groove, respectively, and having 2.5-15% of the width of the read, and a pair of narrower circumferential straight grooves provided adjacent to and axially outside the circumferential ribs, respectively, and having 0.5 to 5% of the width of the tread are appropriately combined, the ice/snow road-running pattern which enhances both the traction performance and the cornering characteristic on ice and snow can be provided.

What is claimed is:

1. A pneumatic tire provided with a directional tread pattern, said directional tread pattern comprising: a wide centered circumferential straight groove dividing the tread into right and left sides, inclined grooves on each side of the wide centered circumferential straight groove, a pair of circumferential ribs provided adjacent to right and left sides of the wide centered circumferential straight groove, respectively, and a pair of narrow circumferential straight grooves provided adjacent to and axially outside the circumferential ribs, respectively, wherein:

(1) a groove width of the wide centered circumferential straight groove is 7 to 25% of the width of the tread;

(2) a width of each of the circumferential ribs is 2.5 to 15% of a width of the tread;

(3) each of said narrow circumferential straight grooves has a groove width being 0.5 to 5% of that of the tread and a groove depth being 50 to 100% of that of the wide centered circumferential straight groove; and (4) each of the circumferential ribs is provided with a plurality of sipes extending obliquely relative to the circumferential direction while being spaced in the circumferential direction, a depth of each sipe being 25 to 100% of the groove depth of the wide centered circumferential straight groove.

2. The pneumatic tire set forth in claim 1, wherein a number of blocks are arranged between said narrow circumferential straight grooves and each of end portions of the tread while being spaced from one another in the circumferential direction, and each of the blocks is provided with a number of sipes spaced in the circumferential direction.

3. The pneumatic tire set forth in claim 1, wherein a depth of each of the sipes provided in the circumferential ribs is smaller than the groove depth of the narrow circumferential straight grooves.

4. The pneumatic tire set forth in claim 1, wherein the depth of each of the sipes provided in the circumferential ribs is greater than the groove depth of each of the narrow circumferential straight grooves.

5. The pneumatics tire set forthin in claim 2, wherein a depth of each of the sipes provided in the circumferential ribs is smaller than the groove depth of the narrow circumferential straight grooves.

6. The pneumatic tire set forth in claim 2, wherein the depth of each of the sipes provided in the circumferential ribs is greater than the groove depth of each of the narrow circumferential straight grooves.

* * * * *